United States Patent [19]

Morris et al.

[11] Patent Number: 5,482,551
[45] Date of Patent: Jan. 9, 1996

[54] EXTRUDED FIRE RESISTANT CONSTRUCTION AND BUILDING PRODUCTS

[75] Inventors: Debra L. Morris, Oxford; Albert G. Landers, Millersville, both of Pa.

[73] Assignee: Armstrong World Industries, Inc., Lancaster, Pa.

[21] Appl. No.: 319,195

[22] Filed: Oct. 6, 1994

Related U.S. Application Data

[63] Continuation-in-part of Ser. No. 123,107, Sep. 20, 1993, abandoned.

[51] Int. Cl.$^6$ ................................................. C04B 11/00
[52] U.S. Cl. ........................... 106/772; 106/773; 106/774; 106/778; 106/780; 52/309.12
[58] Field of Search ..................... 106/772, 774, 106/778, 780, 785, 773; 52/309.12, 309.17, 813, 309.13; 264/176.1, 177.2

[56] References Cited

U.S. PATENT DOCUMENTS

| | | | |
|---|---|---|---|
| 3,746,680 | 7/1973 | Boricheski | 260/29.2 |
| 4,287,103 | 9/1981 | Francis et al. | 260/17 |
| 4,443,261 | 4/1984 | Nordqvist | 106/772 |
| 4,686,253 | 8/1987 | Struss et al. | 106/675 |
| 5,049,196 | 9/1991 | Ries | 106/672 |
| 5,174,818 | 12/1992 | Symons | 106/686 |
| 5,277,712 | 1/1994 | McInnis | 106/780 |
| 5,344,490 | 9/1994 | Roosen et al. | 106/778 |

FOREIGN PATENT DOCUMENTS

| | | |
|---|---|---|
| 614714 | 2/1961 | Canada . |
| 929325 | 7/1973 | Canada . |
| 0056464 | 3/1984 | Japan . |
| 0171261 | 9/1985 | Japan . |
| 881045 | 11/1981 | U.S.S.R. . |
| 984647 | 3/1965 | United Kingdom . |
| 1049184 | 11/1966 | United Kingdom . |

*Primary Examiner*—Paul Marcantoni

[57] ABSTRACT

An extrudable composition is provided which is made up primarily of gypsum, a binder/rheology aid and water with a crumbly, semi-dry consistency. The extrudable composition described can be extruded through a die to provide a building product. Density can be minimized and strength optimized by using features of the composition and of the process.

12 Claims, No Drawings

EXTRUDED FIRE RESISTANT CONSTRUCTION AND BUILDING PRODUCTS

This application is a continuation-in-part of U.S. Ser. No. 123,107, filed Sep. 20, 1993, now abandoned, entitled "Extruded Fire Resistant Construction and Building Products".

BACKGROUND OF THE INVENTION

This invention relates generally to construction and building items such as boards, beams, panels, lattice and grid pieces, ceiling and wall panels, and railings. These self-supporting articles are manufactured by an extrusion process using a particular gypsum composition.

FIELD OF THE INVENTION

Various materials have been utilized in extrusion processes to prepare sheets and other articles. U.S. Pat. No. 3,219,467 is concerned with the compositions consisting of asbestos, cement and special modifying additives to form pipe, sheets and other desired shapes and the process to form them being extrusion. Canadian Patent No. 929,325 also describes an extrusion process. According to this reference, an extruded gypsum product can be prepared using a mix made up of gypsum plaster and water. It covers the addition of a synthetic resin (which could be a copolymer of vinyl acetate), the addition of a lightweight aggregate or vermiculite, and the addition of clay.

A mixture containing gypsum is utilized in U.S. Pat. No. 3,872,204 in a continuous manufacture. The gypsum mixture contains insoluble anhydrite, bentonite clay, alcohol and water and an accelerator which is added because the insoluble anhydrite does not rehydrate when added to water.

Gypsum hemihydrate is also utilized in U.S. Pat. No. 4,524,039. This reference describes manufacture of hollow cored construction products such as a partition panel.

Particular problems, however, should be addressed in extruding wall panels using gypsum cement. The panel must have a high enough wet strength to be self supporting and remain intact until dry. In addition to this, board strength (modulus of rupture) must be maximized, but at the same time, density must be lowered as much as possible in order to obtain a product that can be easily handled and installed. This invention describes compositions and wall boards which achieve the maximization of board strength and wet strength but a minimization of density. An extrusion process for the preparation of such products using the extrudable composition is also described.

SUMMARY OF THE INVENTION

A particular composition is provided which utilizes gypsum cement can be extruded into articles needed for buildings and construction. Such articles include beams, boards, grid pieces, railings, and tiles or sheets for ceilings and walls. During the extrusion process, water is added to rehydrate the gypsum cement (calcium sulfate hemihydrate) and also to process the composition as it is extruded into the finished product.

An extrudable composition for the preparation of these articles comprises water, gypsum cement at an amount in the range of from about 40 to about 75% by weight of all of the dry ingredients, and a water soluble or dispersible binder/rheology aid at an amount in the range of from about 0.5 to about 20% by weight of all of the dry ingredients. 10 The composition can optionally contain perlite at a maximum amount of about 35% by weight of the dry ingredients.

The term "dry" is used to indicate the solids portion of the ingredient. Many binder/rheology aids are initially dry but, alternatively, can be mixed with water before being combined with the rest of the ingredients. In addition to this, liquid and semi-solid (gums) binder/rheology aids can be used also. The amounts (weight %) of such liquid or semi-solid ingredients is the weight of the solids portion of the particular ingredient.

The water is provided in a sufficient amount for both the rehydration (or "curing") of the calcium sulfate hemihydrate to calcium sulfate dihydrate and for extrusion processing. The specific amount (of water) can suitably be set at an amount in the range of from about 17 to about 54% by weight of the total amount of gypsum cement and water. Preferably the amount of water will be present at an amount which places the water:gypsum ratio in the range of from about 0.35 to about 0.85 for both the rehydration of the gypsum cement and the processing of the composition into the finished product.

Important product characteristics are low density, high modulus of rupture, and a sufficient wet (green) strength for the product to stay together as it is extruded, cures and dries, producing the calcium sulfate dihydrate. Preferred embodiments, therefore, include features which will improve or maintain the wet strength, further lower density, and/or increase the modulus of rupture. Such preferred embodiments can include added ingredients such as perlite, filler materials, binding aids, and rheology modifiers.

The gypsum cement is found in both the alpha and beta crystalline phase. Acceptably, the gypsum cement can be selected from the group consisting of alpha calcium sulfate hemihydrate and beta calcium sulfate hemihydrate. The inclusion of Beta is preferred because it provides a lower density and still maintains an acceptable strength for use (modulus of rupture).

In the process for making the extruded building product, the ingredients for the gypsum product are mixed to form a homogeneous blend which is then moved through the die pressure head and extruded into the product which then cures and dries. As it is extruding, the composition mixture takes on the shape of the die aperture to become the desired building product. This extruded product continues to remain in this shape and hardens as it dries due to the rehydration of the calcium sulfate hemihydrate to the calcium sulfate dihydrate.

If the extruder being used does not provide a sufficient amount of mixing to make a substantially homogeneous mixture with the ingredients by the time the extrudable composition reaches the die head for the actual extrusion, then the ingredients should be mixed before they are put into the feed input of the extruder. Preferably, in fact, the ingredients are combined and then added to the extruder.

When the instant compositions are utilized, then the die head opening can be up to two times the inner diameter of the extruder barrel. These wide die head openings are required for making the extruded tiles, boards, and panels for ceilings and walls.

An extruded gypsum building product comprises calcium sulfate dihydrate at an amount in the range of from about 46% up to about 85% by weight, a binder/rheology aid at an amount in the range of from about 0.5 to about 15% by weight, a rheology modifier at an amount up to about 10% by weight, perlite at an amount up to about 20% by weight. Using the preferred extrudable compositions, the preferred density and the modulus of rupture strength values can be obtained. For the wall and ceiling boards, tiles and panels, it is particularly desirable to optimize these values.

DESCRIPTION OF THE INVENTION

Processing calcium sulfate hemihydrate formulations through an extruder was a challenging undertaking. The objective was to extrude a sample which has acceptable green strength exiting the die and, at the same time, results in a lower density sample thus optimizing characteristics.

To prepare an extruded article, the composition's ingredients are combined to form a homogeneous mixture which is moved into a die and extruded to form the product. It will be difficult for the extruder equipment to mix the ingredients into a substantially homogeneous mixture if they have not been mixed together before adding them to the extruder. Thus, while the ingredients could be added directly to the extruder and then formed into a homogeneous mixture by the mixing and screw action in the extruder equipment, preferably they are combined and then fed into the extrusion equipment.

Any sequence of addition and/or combining of the ingredients to obtain the mixture before extrusion can be used. When the ingredients of the extrudable composition are combined, it is preferred that all of the water is added at once. After combining and mixing the ingredients of the extrudable composition, the homogeneous mixture has a crumbly consistency. Most preferably, for the best product, the ingredients are sufficiently mixed together to obtain this substantially homogeneous mixture which is then fed into the screw of the extruder.

The extruder conveys the mixture through it by the rotation of the screw and the wiping action of the screw on the extruder barrel. The mix (having a crumbly consistency) is then forced into a die pressure head of the extruder and then extruded. The homogeneous, compacted mix exits the extruder and die taking on the cross-sectional shape of the die. The once crumbly mix has thus been processed inside the extruder into a smooth, well defined shape. In the process for making an extruded product, the mixing action of the extruder screw and the pressure generated at the die head can transform a heterogeneous mixture into a more homogeneous, compacted mix, and then finally the "knitted together" extrudate product.

To produce building articles from a die that is wider than the extruder opening (wall and ceiling panels) the extruder utilized will maintain the flowing feed and build up the feed back pressure. The instant extrudable composition can produce a product at a maximum of two times the inner diameter of the extruder barrel. Surprisingly, the extrudable composition can provide a preferred extrudate building product from a die opening which is between 1.20 and 2 times wider than the inner diameter of the extruder barrel. Most preferably, the ingredients of the extrudable composition are mixed together before adding them to the extruder. This is most especially preferred when preparing a wall or ceiling board.

The binder/rheology aid is water soluble or dispersible. A suitable binder/rheology aid can be selected from the group consisting of polyethylene oxide, polyvinyl alcohol, guar gum, xanthan gum, polyvinyl pyrrolidone, and a cellulosic binder. Acceptably, the polyethylene oxide has a molecular weight in excess of about 100,000. Acceptably, the cellulosic binders have a molecular weight in excess of about 25,000. The higher molecular weights, however, work best since they improve plasticity, and result in a higher modulus of rupture. Preferably, therefore, the polyethylene oxide binder/rheology aid will have a molecular weight in excess of about 300,000, a preferred range is from about 300,000 to about 7,000,000. The cellulosic binder/rheology aid preferably has a molecular weight in excess of about 32,000, preferably in the range of from about 32,000 to about 100,000. Because of the improved properties that the higher molecular weights provide, the use of the higher molecular weight ingredient will allow a decrease in the concentration of the binder/rheology aid. The most preferred binder/rheology aids are the cellulosic binders. A preferred cellulosic binder can be selected from the group consisting of methylhydroxyethylcellulose, hydroxypropylcellulose and hydroxyethylcellulose.

The binder/rheology aid serves a multifunctional role. This ingredient allows the mix to become more homogeneous as it is being processed. It also increases the "flow-like" characteristics (ability to flow) of the mix (giving it plasticity and the ability to move through the extruder). It, therefore, helps the dry, crumbly mix be processed through the extruder and die with increased plasticity. This also improves the ability of the mix to spread out inside the die, advantageously creating the ability to extrude wider than the opening of the extruder barrel.

An optional ingredient which can be added to these compositions is a filler. Preferred embodiments have fillers. A preferred filler is clay, (for example such as attapulgite clay or ball clay) Another filler which can also help the green strength is fiber. In fact, the attapulgite clay and/or cellulosic fiber can be added to improve the extrudate's green strength. The clay can also serve as a rheology modifier.

Clay can be added to the formulation at an amount in the range of from about 0.25 to about 12% by weight of the dry ingredients. In preferred products, a preferred amount of clay is up to about 10% by total dry weight of the ingredients. The fiber can be used at an amount in the range of from about 1 to about 20% by total weight of the dry ingredients to be extruded. The final product can have up to about 20% by weight. Cellulosic fiber especially helps the mix "knit" together and improves the wet strength characteristics.

Additives can be included to reduce the friction generated between the mix and the machine. Such friction-reducers include ingredients such as clay and glycerins. These are used at an amount effective to increase the lubricity of the mix as it is being processed. Suitably the friction-reducers are added to the extrudable composition at an amount in the range of from about 0.1 to about 8% by weight of all of the dry ingredients. Preferred amounts in a product is from about 0.5 to about 5% by total dry weight.

Sample density can be altered and to some extent controlled using several variables. Density can be lowered by adding perlite. The perlite can be selected from the group consisting of 5 pcf (pound per cubic foot) perlite, 9 pcf perlite and 11 pcf perlite (which allows some control over the density).

By using different combinations of the variables (such as water level, binder level, including rheology modifier ingredients, adding perlite), the characteristics of density, green strength and modulus of rupture can be optimized in the extruded product. For example, increased water levels will result in a lower density but this also undesirably affects the green strength of the extrudate. On the other hand, a lower water:gypsum ratio (by weight) will provide a higher green strength but also a higher density. As a solution, by using the other variables, an excellent green strength can be obtained in the extruded product through a low water:gypsum plaster ratio, while the density is reduced with the other variables, such as by adding perlite (especially a low density perlite— about 7 pcf or less). Alternatively, to get a lower density, an increased water:gypsum weight ratio (from about 0.5 to about 0.85) and/or perlite can be used while a sufficient green strength is obtained using rheology modifiers and/or an increased concentration of the binder/rheology aid and/or fibers, preferably cellulosic, can be added to help the strength.

Acceptably, the density of the extruded product can be a maximum of about 80 pcf and preferred embodiments provide a maximum density of about 75 pcf (pounds per cubic foot) or less. The flexural strength (modulus of rupture) can acceptably be at least about 700 psi (pounds per square inch) or more; preferably it is at least about 1000 psi. Most preferably it is at least about 1150. In a preferred product which optimizes the density and mor strength, the density is preferably less than 70 pcf and the modulus of rupture is at least about 1150 psi.

An acceptable water:gypsum weight ratio for the extrudable composition is in the range of from about 0.35 to about 0.85. When the water:gypsum ratio is in the range of from about 0.35 to about 0.5, the product has good flexural and green strength. Since the density will be higher, preferred embodiments (indicated above) are used to reduce the density.

By increasing the water to gypsum ratio to a level in the range of from about 0.5 (1:2) up to about 0.85 (1:1.18), a lower density can be obtained. At these increased water:gypsum ratios, however, ingredients such as rheology modifiers or cellulose fibers (or both) are preferably added to increase the extrudate's green strength. An increased concentration of the binder/rheology aid can also be used.

The rheology modifier can be used at an amount up to about 12% by weight of all of the dry ingredients. In a preferred embodiment, the rheology modifier is present in the finished product at an amount of from about 0.5 to about 10% by weight. A preferred type of rheology modifier is clay, such as, attapulagite clay.

The binder/theology aid concentration in the extrudable composition can be from about 0.5 to about 20% by weight of all of the dry ingredients. Preferably it is used at an increased level of from about 1.25 to about 20% by weight of the dry ingredients.

The screw speed of the extruder can also be modified. A minimum acceptable screw speed of about 15 rpm or greater could be used. Preferably, however, a screw speed of at least 40 rpm (revolutions per minute) is used, and even more preferrably the screw speed is a minimum of 60 rpm. The higher screw speeds can be done without making any changes to the composition's formulation.

The addition of the lightweight aggregate perlite (which can be obtained commercially at 5, 9, and 11 pcf densities) can be used to reduce the density of the sample. The perlite can be ad[ed in an effective amount to reduce the density. Preferably, a perlite (having any of the available densities available) can be added to the extrudable composition (and be present in the product) at an amount in the range of from about 1 to about 35% by weight of the dry ingredients. In the finished product, the perlite is most preferred at a maximum of about 20% by weight (a preferred range being from about 5 to about 20% by wt). Greater amounts than this is normally avoided since these levels are detrimental to other desirable product properties.

Other additives may also be included in preferred embodiments. Such additives include agents such as curing agents, cure-retardants (to slow the reaction), reinforcing fiber (non-cellulosic fiber such as glass, rayon, etc.), and pigments. Ingredients such as fiber and pigment can serve more than one purpose, for example, also acting as a filler. These ingredients are used at an amount effective to obtain the intended result. Preferably such ingredients are used (in the composition or product) at an amount in the range of from about 0.01 to about 8% by weight of all of the dry ingredients. More preferred embodiments of the finished product have such ingredients in amounts in the range of from about 0.1 to about. 6% by weight. Preferably, a filler is included (in the composition and product) at an amount of at least about 0.25% by dry weight.

The following examples are offered to demonstrate the present invention and should not be taken to limit it. All parts and percentages are by weight unless otherwise indicated.

EXAMPLES

Procedure:

The following procedure was used to extrude compositions having the formulations shown in Examples 1–19 which follow. The procedure and compositions were used to extrude samples of wall panels and boards. The extruded samples were cut into tiles measuring 9×1×½ inches. These tiles were then tested to determine the modulus of rupture. The data collected on these products are shown in each example. All of the ingredients of the indicated formulation were mixed together before feeding them into the extruder (perlite, calcium sulfate hemihydrate, binder/rheology aid, fiberized cellulose paper, clay, water, etc.).

The ingredients were mixed as follows. The retarder (to slow the setting of the gypsum) was added to the water and stirred until it dissolved and glycerin (the lubricating aid) was then added to the water/retarder solution. The retarder used in these examples was sodium citrate and it was used at an amount of 0.5 grams (g) per 1000 g of water. The solution of water/retarder/lubricating aid was then put into a Readco single paddle mixer and a mixture of the remaining ingredients was added. This was mixed for one minute on a low speed (62 rpm) and an additional 30 seconds on a faster mixer speed (127 rpm). The crumbly, semi-dry mixture was then manually fed into the feed side of the extruder.

From one extrusion process to another, the residence time of the mix in the extruder and the die will vary with the setting of the screw speed and the length of the die and its transitional section. For each example the pressure measured in the die head at the time of the run was approximately 70 psi, and the temperature of the extrudate exiting the die ranged from 80° to 84° F. The extruded material is transported away from the die by a belt conveyor.

Modulus of Rupture:

The modulus of rupture (mor) values given in the following examples were performed to determine strength. The mor was determined using an Instron Series IX, set up using a 3 point loading at a cross head speed of 0.5 in/min. at an eight inch (in.) span. The tile samples tested were 9×1×½ inches. The mean value is reported for the modulus of rupture (as indicated in examples which follow) This is the mean value which was obtained for extruded samples and which can be expected for a particular sample having the stated formulation. The modulus of rupture (MOR) is reported in pounds per square inch (psi). Density:

The density is given in the Examples which follow in pounds per cubic foot (pcf). The mean value is reported (as indicated). This is the mean value which was obtained for extruded samples and which can be expected for a particular extruded sample having the stated formulation.

EXAMPLE 1

The following formulation was used to extrude a building product:

| Ingredients | Total Wt. (grams) |
| --- | --- |
| alpha calcium sulfate hemihydrate | 1249 |
| perlite (5 lb.) | 299.5 |
| fiberized cellulose paper | 66.5 |
| ball clay, KT-195 | 199.5 |
| hydroxypropylcellulose binder/rheology aid | 50.0 |
| water | 565 |

The water/gypsum ratio used was 0.45. Sodium citrate, as a retarder was added with the water at an amount of 0.5 grams (g) per 1000 g of water. The alpha, calcium sulfate hemihydrate was from United States Gypsum, and the binder/rheology aid was Natrosol (from Dow Chemical).

The resulting extrudate product was measured for both density (pcf—pounds per cubic foot) and modulus of rupture (MOR) with the following results:

| Sample No. | Density (pcf) | MOR (psi) |
| --- | --- | --- |
| 1 | 68.92 | 1425 |
| 2 | 69.32 | 1367 |
| 3 | 70.95 | |

EXAMPLE 2

For this example, the beta form of gypsum cement (from Georgia-Pacific) was used. The binder/rheology aid was hydroxypropylcellulose (Natrosol from Dow Chemical).

The formulation used was:

| Ingredient | Parts by Wt. (grams) |
| --- | --- |
| beta calcium sulfate hemihydrate | 1249 |
| perlite (5 lb.) | 299.5 |
| fiberized cellulose paper | 66.5 |
| ball clay, KT-195 | 199.5 |
| binder/rheology aid | 55.2 |
| water | 837 |

The water/gypsum ratio used in the composition was 0.67. Sodium citrate was included with the water as a retarder. It was used in the amount of 1 gram (g) per 1000 g of water.

Six samples were extruded for this example and the density and modulus of rupture were measured for each. The highest density obtained out of the six samples was 56.6 pounds per cubic foot (pcf), the lowest was 55.7 pcf, and the average was 56.1 pcf. The mean modulus of rupture (flexural strength) for the same six samples was 1259 psi (pounds per square inch) with a standard deviation of 113.

EXAMPLES 3–8

Samples 3–8 were extruded using the previously described procedure and the following formulation:

| Ingredient | Parts by Wt. (g) |
| --- | --- |
| alpha calcium sulfate hemihydrate | 1249 |
| perlite (5 lb.) | 299.5 |
| fiberized cellulose paper | 66.5 |
| ball clay, KT-195 | 199.5 |
| methylhydroxyethylcellulose binder/rheology aid | 27.6 |

Sodium citrate was used to retard the reaction; it was used at an amount of 0.5g/1000 g of water. The methylhydroxyethylcellulose was Culminal 40 (from Hercules).

In order to compare the product characteristics at different water:gypsum values, a different water/gypsum (weight) ratio was used for each (indicated for each example in Table I). Table I also shows the mean values for density and flexural strength (MOR). Six samples were prepared per example; the mean value is listed.

TABLE I

| Ex. No. | Wt. of Water | $H_2O$/Gypsum Ratio | Mean Density (pcf) | Mean MOR (psi) | MOR Standard Deviation |
| --- | --- | --- | --- | --- | --- |
| 3 | 499 | 0.40 | 78.25 | 2027 | 177 |
| 4 | 556 | 0.44 | 73.1 | 2059 | 112 |
| 5 | 624.5 | 0.50 | 69.2 | 1942 | 122 |
| 6 | 712 | 0.57 | 65. | 1677 | 110 |
| 7 | 837 | 0.67 | 61.8 | 1520 | 65 |
| 8 | 999 | 0.80 | 54.8 | 1292 (of 5) | 58 |

Table I shows that density can be decreased by increasing the amount of water used relative to the gypsum. Also demonstrated are the exceptional modulus of rupture (MOR) values obtained with the present invention; the MOR values in excess of about 700 psi which are obtained are particularly important for building products where strength is needed for such applications. The lower water/gypsum ratio is preferred for higher flexural strength (MOR).

COMPARATIVE EXAMPLES A–D

The exact formulations which were used for Examples 3, 4, 6, and 8 in our application were used to prepare samples A, B, C and D (respectively). The ingredients of the samples were mixed, and molded. Sample A, having a water:gypsum ratio of 0.4, was too dry for this process and it fell apart. The other samples (B–D) were dried. After the samples had dried and cured the density and modulus of rupture (MOR—given below in pounds/sq.in.) was then tested for each sample.

| Sample No. | Water:Gypsum Ratio | Density (pcf) | MOR (psi) |
| --- | --- | --- | --- |
| A | .4 | — | — |
| B | .44 | 53 | 297 |
| C | .57 | 64 | 349.6 |
| D | .8 | 72 | 372.3 |

In the comparison of samples A–D with 3, 4, 6, and 8 above, it is seen that extrusion and the particular water:gypsum ratio used in the extrusion process will deliver extremely high MOR strength values of in the extruded product. The extruded product is thus, distinct if the water and gypsum level are controlled together.

It can also be seen in the comparison that as the water is increased relative to the gypsum in the molding process, the density increases. The opposite occurrs in extrusion. In addition to this, it is noted that extrusion requires less water to produce a product. Molding cannot even give a product at the lower water levels which can be used in extrusion.

EXAMPLES 9–13

Samples were extruded using the previously described procedure. In order to compare the product characteristics at different binder values, a different amount of the binder/rheology aid (b/r aid) was used in each Example. The following formulation was used:

| Ingredient | Parts by Wt. (g) |
| --- | --- |
| alpha calcium sulfate hemihydrate | 1249 |
| perlite (5 lb.) | 299.5 |
| fiberized cellulose paper | 66.4 |
| ball clay, KT-195 | 199.5 |
| sodium citrate | 1 |
| water | 550 |

The b/r (binder/rheology) aid was hydroxypropylcellulose (Natrosol from Dow), and the amount of b/r aid used is indicated for each example in Table III. The alpha form of the gypsum cement (alpha calcium sulfate hemihydrate) was used for these examples.

TABLE III

| Ex. No. | B/R Aid (g) | B/R Aid (wt. %) | Density (pcf) | MOR (psi) | MOR Standard Deviation |
| --- | --- | --- | --- | --- | --- |
| 9  | 18   | 1.0 | 69.2 | 1260 | 87 |
| 10 | 27.6 | 1.5 | 67.8 | 1394 | 76 |
| 11 | 37   | 2.0 | 68.1 | 1493 | 112 |
| 12 | 46.5 | 2.5 | 68.9 | 1662 | 83 |
| 13 | 56   | 3.0 | 68.2 | 1774 | 114 |

EXAMPLES 14–17

To provide a comparison to previous Examples 9–13, samples were extruded using a different binder/rheology (b/r) aid. Examples 14–17 also show different b/r aid levels demonstrating product characteristics when the methylhydroxyethylcellulose is increased.

Samples 14–17 were extruded using the previously described procedure. The b/r aid used was methylhydroxyethylcellulose (Culminal from Hercules). The following formulation was used:

| Ingredient | Parts by Wt. (g) |
| --- | --- |
| alpha calcium sulfate hemihydrate | 1249 |
| perlite (5 lb.) | 299.5 |
| fiberized cellulose paper | 66.4 |
| ball clay, KT-195 | 199.5 |
| water | 550 |

The amount of b/r aid used for each example is indicated in Table IV. The alpha form of the gypsum cement (alpha calcium sulfate hemihydrate) was used for these examples.

The density and modulus of rupture values reported in the table below are a mean value of seven samples prepared with each single b/r aid concentration.

TABLE IV

| Ex. No. | B/R Aid (wt. %) | Density (pcf) | MOR (psi) | MOR Standard Deviation |
| --- | --- | --- | --- | --- |
| 14 | 1.5 | 75.2 | 2056 | 157.1 |
| 15 | 2.0 | 75.2 | 2079 | 158.4 |
| 16 | 2.5 | 75.0 | 2284 | 135 |
| 17 | 3.0 | 74.9 | 2403 | 211 |

EXAMPLE 18

The previously described procedure was used with the following formulation:

| Ingredient | Parts by Wt. (g) |
| --- | --- |
| alpha calcium sulfate hemihydrate | 1249 |
| perlite (5 lb.) | 299.5 |
| fiberized cellulose paper | 66.4 |
| ball clay, KT-195 | 199.5 |
| methylhydroxyethylcellulose b/r aid | 27.6 |
| water | 565 |

Sodium citrate was used as a retarder at an amount of 0.5g/1000g of water.

The density and modulus of rupture of the extruded product were measured. The highest density obtained out of the seven samples was 77.3 pounds per cubic foot (pcf), the lowest was 73.2 pcf, and the average was 75.2 pcf. The mean modulus of rupture for the same seven samples was 1630 psi (pounds per square inch) with a standard deviation of 97.

What is claimed is:

1. An extruded gypsum building product which comprises calcium sulfate dihydrate at an amount in the range of from about 46% up to about 85% by weight, a binder/rheology aid which is a cellulosic binder, said binder/rheology aid being present at an amount in the range of from about 0.5 to about 15% by weight, optionally perlite at an amount in the range of from about 1 to about 35% by weight, wherein said building product has a modulus of rupture of at least about 700 pounds per square inch, and wherein further, the building product was extruded with a composition having a water:calcium sulfate hemihydrate weight ratio in the range of from about 0.5 to about 0.85 and fiber for green strength at an amount in the range of from about 1 to about 20% by dry weight.

2. The building product of claim 1 wherein the cellulosic binder is selected from the group consisting of hydroxyethylcellulose, methylhydroxyethylcellulose, and hydroxypropylcellulose.

3. An extruded gypsum building product which comprises calcium sulfate dihydrate at an amount in the range of from about 46% up to about 85% by weight, a binder/rheology aid which is a cellulosic binder, said binder/rheology aid being present at an amount in the range of from about 0.5 to about 15% by weight, perlite at an amount in the range of from about 1 to about 35% by weight, wherein further, the building product has a modulus of rupture of at least about 700 pounds per square inch and was extruded with a composition having a water:calcium sulfate hemihydrate weight ratio in the range of from about 0.35 to about 0.5 and fiber for green strength at an amount in the range of from about 1 to about 20% by dry weight.

4. The building product of claim 3 wherein the cellulosic binder is selected from the group consisting of hydroxyethylcellulose, methylhydroxyethylcellulose and hydroxypropylcellulose.

5. The building product of claim 3 wherein the composition further contains clay as a rheology modifier at an amount in the range of from about 0.25 to about 12% by dry weight.

6. An extruded gypsum building product which comprises calcium sulfate dihydrate at an amount in the range of from about 46% up to about 85% by weight, methylhydroxyethylcellulose as a binder/rheology aid which is present at an amount in the range of from about 0.5 to about 15% by weight, perlite at an amount in the range of from about 1 to about 35% by weight and optionally cellulose fibers at an amount up to about 20% by weight; wherein further, the building product was extruded with a composition having a water:calcium sulfate hemihydrate weight ratio in the range of from about 0.35 to about 0.85, the water being present at a sufficient amount for both the rehydration of the calcium sulfate hemihydrate to calcium sulfate dihydrate and for extrusion processing, and said building product having a modulus of rupture of at least about 700 pounds per square inch.

7. The building product of claim 6 which further is a board, tile or panel for a wall or ceiling.

8. The building product of claim 6 wherein the composition further contains clay as a rheology modifier at an amount in the range of from about 0.25 to about 12% by dry weight.

9. The building product of claim 6 which further contains glycerin as a friction reducer, said glycerin being present in the product at an amount in the range of from about 0.5 to about 5% by total dry weight.

10. The building product of claim 1 wherein the composition further contains glycerin as a friction-reducer at an amount in the range of from about 0.1 to about 8% by weight of all dry ingredients.

11. The building product of claim 1 wherein the composition further contains clay as a rheology modifier at an amount in the range of from about 0.25 to about 12% by dry weight.

12. The building product of claim 3 wherein the composition further contains glycerin as a friction reducer at an amount in the range of from about 0.1 to about 8% by weight of all dry ingredients.

* * * * *